Sept. 7, 1954  F. A. HOWARD  2,688,534
SEGREGATION AND PEAK LOAD USE OF ETHANE IN NATURAL GAS
Filed Jan. 27, 1950  2 Sheets-Sheet 1
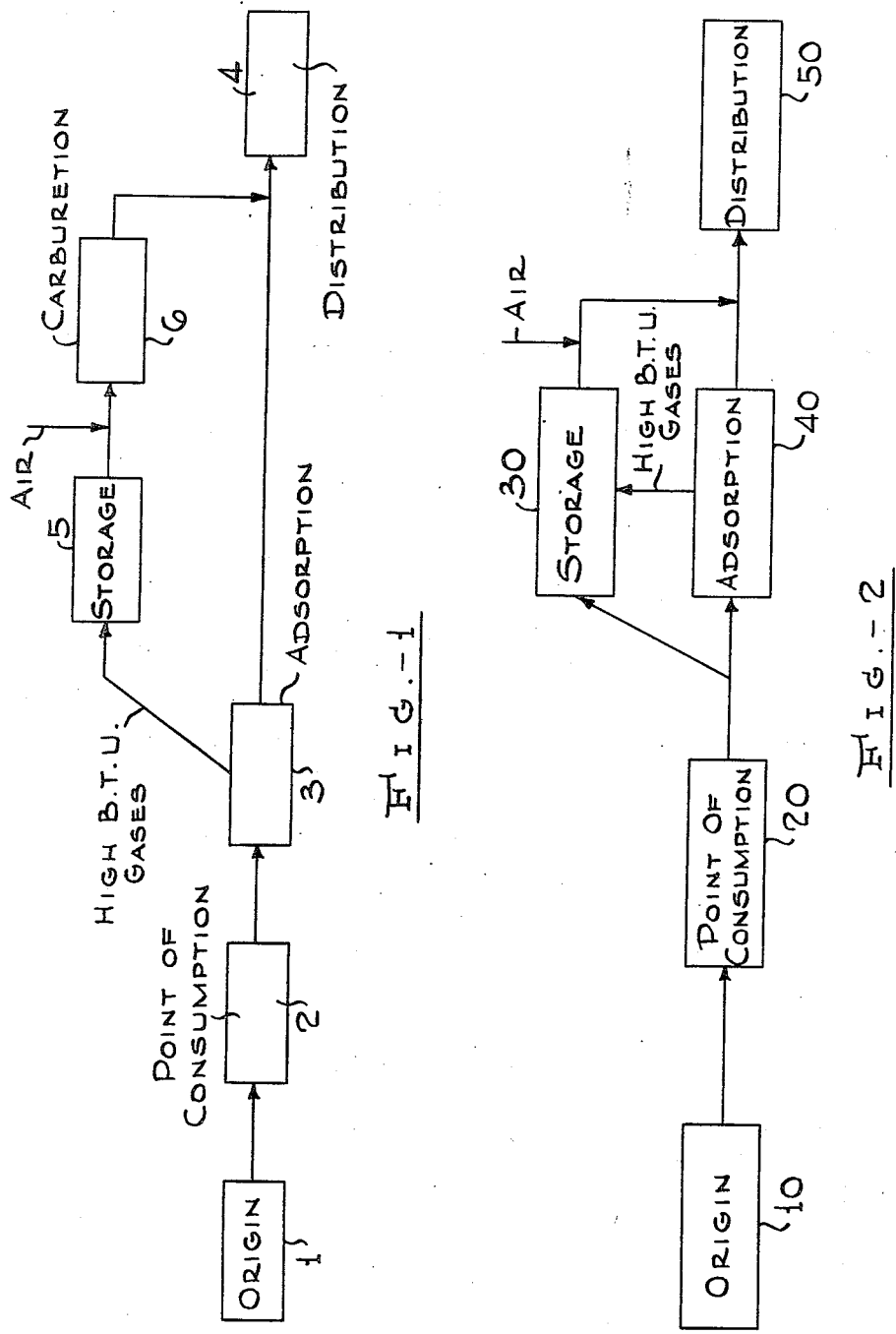
Frank A. Howard Inventor
By W. O. Tulman Attorney Patented Sept. 7, 1954

2,688,534

UNITED STATES PATENT OFFICE 2,688,534

SEGREGATION AND PEAK LOAD USE OF ETHANE IN NATURAL GAS

Frank A. Howard, New York, N. Y., assignor to Standard Oil Development Company, a corporation of Delaware Application January 27, 1950, Serial No. 140,785

6 Claims. (Cl. 48—190)

This invention relates to a method for obtaining a source of natural gas for peak load use and, more specifically, relates to a method for increasing the B. t. u. value of stored natural gas suitable for such peak load use by the enrichment thereof with ethane with or without higher hydrocarbons segregated from a portion of the natural gas stream.

One of the worst problems of the natural gas business is the difficulty in meeting the peak loads in the heating season. There is a seasonal peak for the entire cold weather season and there are daily peaks resulting from extreme cold spells which may last only a few days and may occur only once or twice during a winter. It is general practice to divert excess gas which is available during low-load summer months to storage and to withdraw this stored gas during peak winter months. In addition to this, the seasonal peak is met by cutting off industrial consumers and by increasing the deliveries through the trunk lines. The extreme daily peaks are met either by the liquefaction of the natural gas and its storage in refrigerated storage reservoirs and/or by storing propane and butane gas in pressure tanks and delivering a mixture of air carburetted with propane and/or butane up to the approximate B. t. u. value of natural gas, into the distributing mains where it mixes with the natural gas and augments the supply for these daily peaks. In the past, this propane and butane have been obtained by recovering these fractions from natural gas at or near the point of origin.

All of these methods have their drawbacks. Obviously, there is a limit to the amount of savings which can be obtained by cutting off industrial consumers and increasing deliveries through the trunk lines. Limitations on the volume of underground and refrigerated storage capacity and the volumetric rate at which the gas can be put into and withdrawn from storage prevents off-peak storage from affording a solution to the problem. The expedient of adding air and propane and/or butane to the natural gas has gone into very wide use in the natural gas business and has produced a great demand for propane and butane and for the pressure tank cars which carry it from the point of production. This demand has become so great that there have been recurrent shortages. These shortages and the relatively high delivered cost of the propane have prevented the gas companies from expanding their use of propane.

The present invention affords a means for overcoming difficulties enumerated above in connection with the off-peak storage of natural gas and its enrichment with propane. According to this invention dry natural gas is transported from the point of origin to a distant point of consumption and the ethane and heavier constituents are segregated from the total gas flow and are either stored as such or are added to the portion of gas being stored for peak load use. By the term "dry natural gas" is meant natural gas which does not contain propane or butane or higher hydrocarbons in quantities sufficient to justify their recovery for ordinary purposes. If the segregated gas is stored alone it can be subsequently used to carburet air and the mixture added to natural gas for peak load use or it can be used to carburet a lean gas, such as water gas or reformed natural gas or "synthesis gas" (a mixture of carbon monoxide and hydrogen) made from natural gas.

All gas delivered into a distribution system must have approximately the same "performance number." The "performance number" is a mathematical function of the specific gravity and heating value of the gas, such that the lower flow of a higher specific gravity of the gas through the jet openings in a domestic or industrial burner will be compensated for by the higher B. t. u. value or vice versa. This relationship is expressed by the formula.

$$\text{performance number} = hA/d$$

where $h$=heat value of the gas in B. t. u./cu. ft.; $A$= theoretical air for combustion in volumes per volume of gas.

The "performance number" must be kept within a range of about plus or minus 0.1 to 0.15 to avoid trouble for the consumer. Since natural gas is sold by the cubic foot, the B. t. u. value of butane per cubic foot must be very high when butane is used to supplement natural gas at peak loads because of the very high specific gravity of the mixture. For this reason, it becomes desirable to use the lowest specific gravity base and the lowest specific gravity enriching gas when a carburetted gas is used to replace natural gas in a distribution system in which it is sold by the cubic foot. The use of ethane, according to this invention, therefore, affords a means for obtaining an enriched gas having a low specific gravity.

Certain preferred details of construction together with additional objects and advantages will be apparent and the invention itself will be best understood by reference to the following specification and to the accompanying drawings wherein:

Figure 1 is a diagrammatic illustration of one method of applying the present invention to the supplying of natural gas to consumers at points remote from the source of supply;

Figure 2 represents another embodiment of applying the invention to augment the supply of natural gas during periods of peak load consumption;

Figure 3:
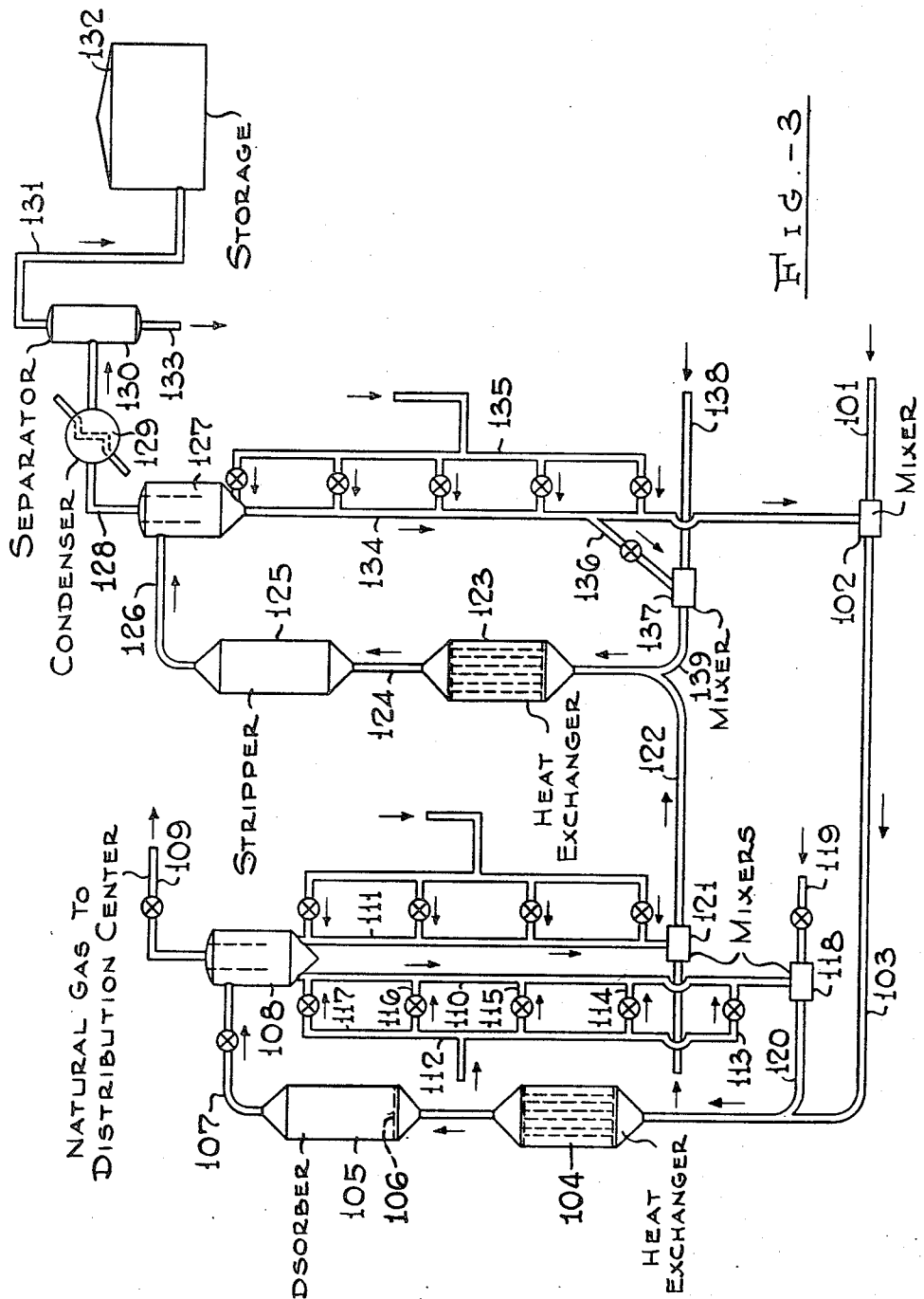
Figure 3 is a diagrammatic illustration of one method of separating the gases of high B. t. u. from the natural gas stream.

Referring, therefore, to Figure 1, dry natural gas is conveyed from the point of origin 1 to a region of consumption 2 under high pressure. While still under super-atmospheric pressure, the gas is passed through a fluidized bed of adsorbent carbon 3 at such a rate as to adsorb on the carbon substantially all the high B. t. u. gases present, e. g., ethane, propane and butane. Since these gases are present in relatively small proportions, the heating value of the gas is not appreciably affected. After passing through the adsorbent bed, the gas is delivered to the distribution system 4 of the consumption region in the usual way. The recovered high B. t. u. gases, i. e., the ethane and any propane and butane present, are passed to storage 5 and in periods of peak demand for natural gas they are used to carburet other gases (as at 6) up to an appropriate specific gravity and heating value and passed to the distribution center 4 to augment the supply available in the consuming region. The make-up gas may be air, inert gas, or some low B. t. u. gas, such as water gas produced by direct reaction of oxygen or air with natural gas.

An alternative method is shown in Figure 2 in which about 40%, for example, of the gas arriving at the point of consumption 20, is diverted to storage 30 and the remaining 60% of the gas is passed through adsorption zone 40 to remove the high B. t. u. gases which are added to the 40% being stored. The stored gas thus enriched is then added to the gas being distributed during periods of peak demand. Storage 30 may be either gaseous storage in natural reservoirs such as old depleted gas fields near the point of consumption or liquid storage in tanks in which the methane fraction itself is stored as a liquid enriched with ethane and higher hydrocarbons removed in the absorber plant.

Illustrative of the advantages of the present invention, a natural gas having the following typical analysis Table 1

| Constituent | Gas, Vol. Percent | Heating Value, B. t. u./cu. ft. |
| --- | --- | --- |
| Methane | 94.0 | 1,000 |
| Ethane | 4.0 | 1,760 |
| Propane | 1.5 | 2,510 |
| Butane | 0.5 | 3,260 |
| Total | 100.0 | [1] 1,064 |

[1] Average for mixture.

will have a total B. t. u. value of 1064 B. t. u./cu. ft. If 40% of the total gas flowing from the producing field is diverted to storage and 6 volume percent of the C2+ constituents are segregated from the remaining 60% and added to the 40% being stored, the composition and heating value of the gas sent to storage would be as follows:

Table 2

| Constituent | Gas, Vol. Percent | Heating Value, B. t. u./cu. ft. |
| --- | --- | --- |
| Methane | 85.1 | 1,000 |
| Ethane | 10.0 | 1,760 |
| Propane | 3.7 | 2,510 |
| Butane | 1.2 | 3,260 |
| Total | 100.0 | [1] 1,159 |

[1] Average for mixture.

The heating value of 1159 B. t. u./cu. ft. of the resulting gas represents an increase of about 9% over that sent to storage and thus a corresponding increase in the number of B. t. u.'s which can be stored in a given volume of underground storage.

Thus, according to one aspect, the process of the present invention consists in the removal from natural gas of all constituents having a B. t. u. above 1000 per cubic foot, the storage of these constituents during off peak periods and the addition of these high B. t. u. gases to natural gas during peak loads to increase the B. t. u./cu. ft.

The adsorption of the high B. t. u. gases shown in Figures 1 and 2 may be carried out in any manner known to the art. A suitable method consists in the treatment of the gas with a fluidized stream of activated charcoal, followed by desorption of the absorbed material by the action of steam and elevated temperatures. Such a method is shown in detail in Figure 3. Referring, therefore, to this figure, dry natural gas from the point of consumption is passed by line 101 to a mixing chamber 102 in which it is admixed with activated carbon. This product is in finely-divided form, capable of selectively adsorbing the high B. t. u. constituents, such as ethane, propane and butane, etc., from the gases. The mixture of gas and adsorbed material is then passed from mixing chamber 102 through line 103 having a heat exchanger 104 to a treating chamber 105 in which the charcoal is intimately mixed with the natural gas.

In case the charcoal introduced into the mixing chamber 102 is in highly heated condition, such as in the case when the charcoal is freshly separated from the stripping gas, the heat exchanger 104 may be used to cool the mixture to the desired temperature for adsorption. In other cases where the charcoal and natural gas are relatively cool as in starting the process, the heat exchanger 104 may be used for heating the mixture.

The mixture of adsorbent material and gases is passed through the adsorbent chamber at a relatively low velocity so that there is a tendency for the powdered charcoal to settle or separate from the gas. However, the rate of flow of the gas is greater than the rate of settling so that the tower never becomes completely packed with powdered material.

By operating in this manner, an intimate and continuous intermingling of the charcoal and gas is attained. Furthermore, the residence time of the charcoal within the adsorber may be regulated over a wide range so as to insure complete saturation of the charcoal before removal from the chamber. It will be understood, however, that the residence time of the charcoal within the adsorber 105 will usually be considerably greater than the residence time of the gases within the chamber. For example, the time required for passage of the charcoal through the adsorber may range from 20 seconds to one hour or more, whereas the time required for the passage of the gas through the chamber may be of the order of from 2 seconds to 10 minutes. Expressed in other words, the density of the gases and the powdered material within the adsorber 105 is normally greater than the density of the stream passing to and from said chamber. To insure distribution of the gas and the solid material throughout the adsorber, the chamber may be provided with distributing plate 106 having spaced perforations through which the suspension of solids and gases passes.

The products after passing through the adsorber 105 are transferred through line 107 to a suitable separator such as a cyclone separator 108 for removing dust or other solids from gases.

The gas after passing through the initial separator 108 is withdrawn through line 109 and, if desired, may be passed to additional separators (not shown) for further purification before being vented from the system.

Charcoal separated from the gas in the separator 108 feeds by gravity into the top of a standpipe or tower 110 from which it may be returned to the adsorber as later described or into a second standpipe 111 from which it may be passed to a stripping zone to be later described. The height of the tower 110 is sufficient to develop a static pressure of powder at the bottom thereof sufficient to feed the adsorbent material into a stream of gases being recycled to the heat exchanger 104 and adsorber 105. In other words, the head of adsorbent material maintained in the vertical column 110 should be sufficient to develop a pressure at the bottom thereof which will overcome the pressure drop through the heat exchanger 104, adsorber 105 and the connecting lines. In order to transmit the pressure through the adsorbent material mass in the column 110, it is essential that the mass contained therein be in a freely flowing, fluidized condition. To insure this, a fluidizing gas may be introduced at any one or more spaced points along the length of the tower through line 112 having branched lines 113, 114, 115, 116, and 117, respectively. The adsorbent material from the bottom of the standpipe 110 may be fed into a mixing chamber 118 from which it may be remixed with fresh gas to be treated which is introduced into the mixing chamber through line 119. The resulting mixture of fresh gas and recycled charcoal passes through line 120 to the heat exchanger 104 where it intermixes with additional fresh gas introduced through line 101.

Charcoal collected in the standpipe 111 discharges from the bottom thereof into a mixing chamber 121 wherein it admixes with a suitable inert stripping gas such as steam, or the like, introduced into the mixing chamber through line 122. The height of the standpipe 111 which charges the adsorbent material into the stripping gas should be of a height sufficient to develop a pressure at the bottom thereof which will feed the solid contact material into the steam which in turn must be under a pressure at least sufficient to pass the resulting mixture through the stripping zone and related equipment. A fluidizing gas may be introduced at any one or more spaced points along the vertical column 111 to maintain the charcoal in freely flowing condition as in the case of column 110.

The mixture of charcoal and steam passes from the mixing chamber 121 through line 122 to a heat exchanger 123 wherein the mixture is heated to a temperature sufficient to liberate high B. t. u. constituents adsorbed on the adsorbent material during passage through the adsorber 105. The heated products from the heat exchanger 123 then pass through line 124 to a stripping chamber 125 wherein the charcoal is retained for a period sufficient to distill or strip the adsorbed products from the charcoal.

The velocity of the steam through the stripping chamber 125 is controlled as previously described in connection with the adsorber 105 so that the charcoal travels at a materially lower velocity than the gases. As a result, there is a continuous intermixing of gas and powder.

The mixture of gases and charcoal passes from the stripper 125 through line 126 into a suitable separator such as a cyclone separator 127 in which the bulk of the high B. t. u. constituents, e. g. ethane and any propane and butane present, are separated from the charcoal.

Gases separated from the charcoal in the separator 127 are remover therefrom through line 128 and are passed to a suitable condenser 129 in which the steam is condensed. Products from the condenser 129 pass to a receiver 130 wherein condensed steam separates from the gases. Uncondensed gases are withdrawn from the receiver 130 through line 131 and stored in tank 132 until seasonable demand requires their use as described above. Water is withdrawn from the bottom of the receiver through line 133.

Adsorbent charcoal separated in the cyclone separator 127 discharges into standpipe or vertical volumn 134 of a height at least sufficient to produce a head of pressure at the bottom which will permit feeding it back into the mixing chamber 102 where it meets a stream of fresh gas passing to the adsorber 104.

In order to insure an even flow of the powdered material through the vertical column 134, a fluidizing gas may be introduced at one or more spaced points along the length thereof and in the hopper section of the separator 127.

If desired, a portion of the stripped charcoal from the vertical column or standpipe 134 may be recirculated through the heat exchanger 123 and stripper 125 to maintain the desired temperature within the stripping chamber.

For example, a portion of the stripped charcoal from tower 134 may be passed through line 136 to a mixing chamber 137 wherein it is picked up by a stream of gas introduced through line 138. The resulting mixture passes through line 139 which merges with line 122 carrying the fresh unstripped charcoal to the heat exchanger 123. By regulating the amount of stripped powder recycled through the heater to the stripping zone any amount of heat may be supplied at any desired temperature level without the application of external heat to the stripper.

In many types of operations it may also be desirable to subject some or all of the adsorbent material to a reactivating treatment to remove foreign deposits which may form on the material during the adsorbing operation.

While there has been described and illustrated with considerable particularity one embodiment of this invention, this invention is not to be construed as limited thereto or to the carrying out of the process by the use of apparatus of that character alone, as it will be evident that various changes may be made in the details thereof, if desired, without departing from its principal features and characteristics and from the spirit and scope of the invention as defined in the appended claims. For example, the process has been described in connection with the use of a fluidized bed of charcoal for adsorbing the high B. t. u. constituents, it is obvious that other adsorbents may be used. For example, silica gel, activated alumina, adsorbent clays, etc., may be used either in the fluidized state or in a stationary bed in any manner known to the art.

The nature of the present invention having been thus set forth and illustrated, what is claimed as new and useful and desired to be secured by Letters Patent is:

1. Improved method of meeting natural fuel requirements of varying relatively high and low natural fuel demands which comprises transporting under pressure dry natural gas from a region of origin to a distant region of consumption, removing from said natural fuel gas in the region of consumption during the period of low fuel demands hydrocarbon constituents boiling above methane and storing the same delivering the thus stripped methane to a distribution system, adding to said natural gas in the region of consumption during the period of relatively high demand said stored hydrocarbon constituents, and delivering the thus enriched gas to said distribution system.

2. Process as defined by claim 1 wherein said hydrocarbon constituents removed from said natural gas are removed under pressure by means of a solid adsorbent.

3. Process as defined by claim 2 wherein said adsorbent comprises activated carbon.

4. Improved method of meeting natural fuel requirements of varying relatively high and low natural fuel demands which comprises transporting under pressure dry natural gas from a region of origin to a distant region of consumption, segregating said natural gas in the region of consumption into two fractions and storing one of said fractions, removing from the non-stored fraction during the period of low fuel demand hydrocarbon constituents boiling above methane and storing said removed constituents with said stored fraction, delivering the thus stripped methane to a distribution system, adding to said natural gas during the period of relatively high demand at least a portion of said stored fraction and delivering the thus enriched gas to said distribution system.

5. Process as defined by claim 4 wherein a solid adsorbent is used to remove said hydrocarbon constituents from said non-stored fraction.

6. Process as defined by claim 4 wherein activated carbon is used to remove said hydrocarbon constituents from said non-stored fraction.

References Cited in the file of this patent

UNITED STATES PATENTS

| Number | Name | Date |
|---|---|---|
| 1,422,183 | Curme | July 11, 1922 |
| 1,922,573 | Dunkak | Aug. 5, 1933 |
| 2,090,163 | Twomey | Aug. 17, 1937 |
| 2,446,076 | Campbell et al. | July 27, 1948 |
| 2,495,842 | Gilliland | Jan. 31, 1950 |
| 2,527,964 | Robinson | Oct. 31, 1950 |
| 2,535,148 | Martin et al. | Dec. 26, 1950 |
| 2,541,569 | Born et al. | Feb. 13, 1951 |

OTHER REFERENCES

Spangler, Oil and Gas Journal, vol. 47, pages 94, 95, 96, 99 (May 5, 1949).

"Chemical Engineering," vol. 57, No. 5, May 1950, pages 113–118, published by McGraw-Hill Publishing Co.